United States Patent [19]
Holdenried

[11] Patent Number: 5,916,333
[45] Date of Patent: Jun. 29, 1999

[54] ARRANGEMENT FOR SEALING A HYDRUALIC CONTROL DEVICE

[75] Inventor: Willy Holdenried, Immenstaad, Germany

[73] Assignee: ZF Friedrichshafeh AG, Friedrichshafen, Germany

[21] Appl. No.: 08/981,954
[22] PCT Filed: Sep. 7, 1996
[86] PCT No.: PCT/EP96/03928
  § 371 Date: Jan. 9, 1998
  § 102(e) Date: Jan. 9, 1998
[87] PCT Pub. No.: WO97/10454
  PCT Pub. Date: Mar. 20, 1997

[30] Foreign Application Priority Data

Sep. 14, 1995 [DE] Germany ............ 195 33 977

[51] Int. Cl.⁶ ............................................ F16H 57/02
[52] U.S. Cl. ................................ 74/606 R; 137/884
[58] Field of Search .................. 74/606 R, 467; 137/884

[56] References Cited

U.S. PATENT DOCUMENTS 4,210,034  7/1980  Younger .......................... 74/606 R
4,805,490  2/1989  Fuehrer et al. ................. 74/606 R X

FOREIGN PATENT DOCUMENTS 2228989    12/1974  France .
2 582 061  11/1986  France .
41 34 369 A1  4/1992  Germany .
40 41 253 C2  6/1992  Germany .
1428882     3/1976  United Kingdom .

Primary Examiner—Charles A. Marmor
Assistant Examiner—Mary Ann Battista
Attorney, Agent, or Firm—Davis and Bujold

[57] ABSTRACT

For a hydraulic control device (12) in an automatic transmission (1), it is proposed that the intake channel (7) of a pump be surrounded by a distribution channel (9) so that during the intake of air leakage is prevented.

2 Claims, 2 Drawing Sheets

ARRANGEMENT FOR SEALING A HYDRUALIC CONTROL DEVICE

The invention concerns an arrangement for sealing a hydraulic control device which is assembled on the underside of an automatic transmission. The electromagnetic actuators and hydraulic valves are in the hydraulic control device.

BACKGROUND OF THE INVENTION

By the expression automatic transmission, used in the preamble, is to be understood both stepped and continuously variable automatic transmissions. Electrohydraulic automatic transmissions are composed of the following units: a starting unit such as a hydrodynamic converter, clutch/brakes, a hydraulic control device and an electronic transmission control device. The electronic transmission control device forms, from the input variables, the parameters required for control of the automatic transmission. Input variables are signals prepared by sensors and signals made available by other electronic control devices such as the engine control device. The electronic transmission control device controls, via output signals, the electromagnetic actuators which are in the hydraulic control device. Gearshifts are initiated, via the electromagnetic actuators, by selecting an adequate clutch/brake combination. The pressure distribution during the gearshift and the pressure level outside the gearshift are additionally controlled by the electromagnetic actuators.

From the prior art, for example DE-OS 40 41 253, automatic transmissions are known where the hydraulic control device is assembled on the underside. The hydraulic control device consists of one intake snorkel, one valve housing, one intermediate plate with a seal and one channel plate. Here the channel plate and the transmission housing come into contact by two surfaces. These two surfaces are designed as sealing surfaces. As a result of the setting properties, a change of the pre-load force of the clamping bolts and leakage can occur in this place. Since the hydraulic control device can only be partly wetted by the lubricant pan, leakage results in that the pump, via the intake channel, sucks air from the interior of the transmission instead of sucking hydraulic fluid from the lubricant pan.

SUMMARY OF THE INVENTION

The problem to be solved by the invention is thus to ensure a reliable suction for the hydraulic control device.

According to the invention, the problem is solved by the channel plate having at least one intake channel, one main pressure channel, and measuring and distribution channels wherein the intake channel is surrounded at least partly by a distribution channel. The distribution channel holds a higher pressure level than the intake channel. The distribution channel is between the intake channel and the outer side of the channel plate. The advantage obtained by this solution, according to the invention, is that leakage at the channel plate/transmission housing site does not result in the suction of air. Since the intake channel is surrounded by a distribution channel with a higher pressure level, the leakage causes the intake channel to suck the hydraulic fluid from this distribution channel.

In another embodiment, it is proposed that the main pressure channel be at least partly surrounded by pressureless auxiliary channels situated between the main pressure channel and a measuring channel. The advantage of this embodiment is that an adulteration of the pressure level within the measuring channel, in the case of leakage, is effectively prevented. In the case of leakage, the hydraulic fluid reaches the pressureless auxiliary channels from the main pressure channel. The hydraulic fluid thus cannot reach the measuring channels.

DETAILED DESCRIPTION OF THE PREFERRED EMBODIMENTS

Figure 1:
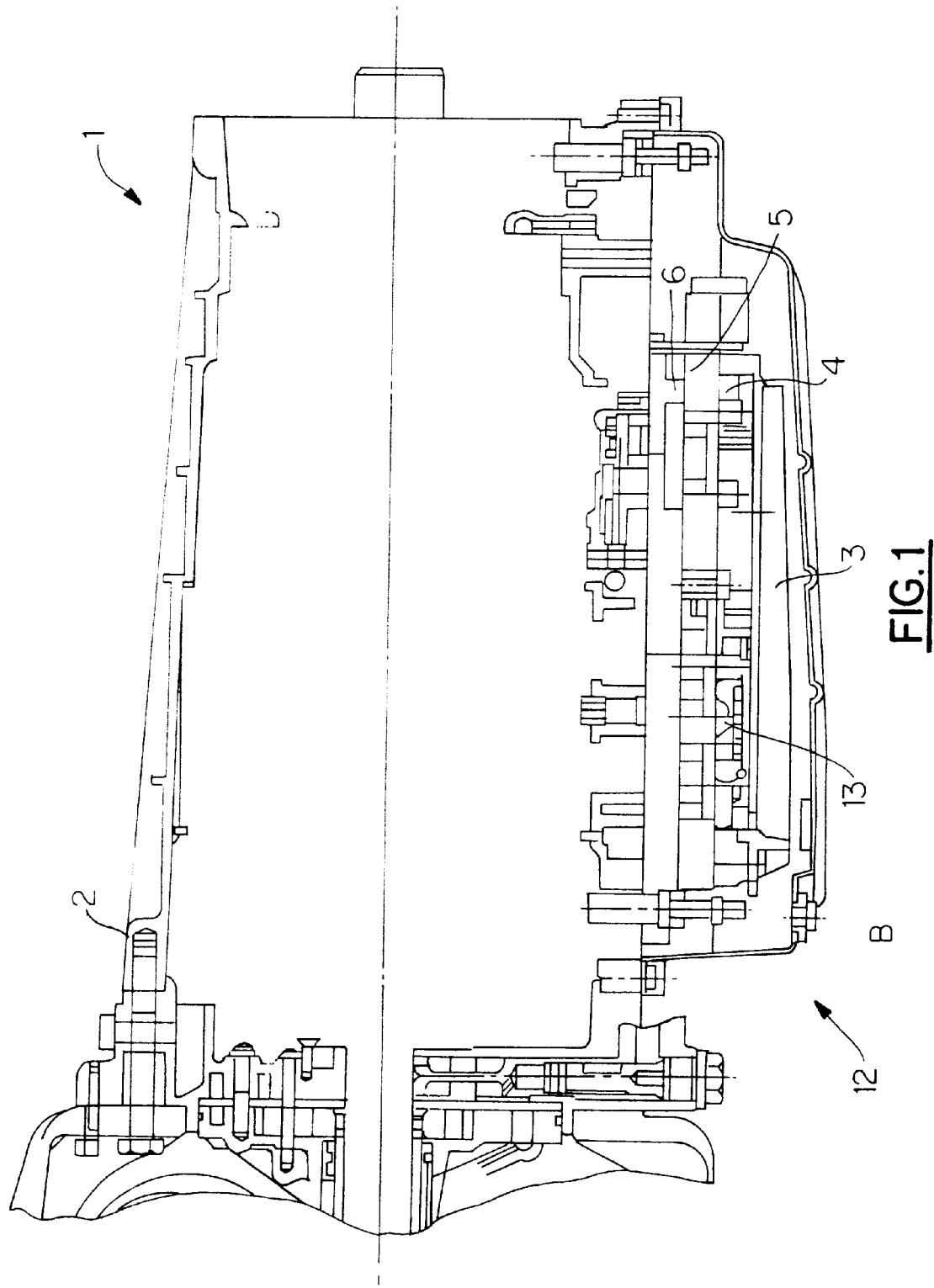
FIG. 1 is an arrangement and a design of a hydraulic control device.

FIG. 1 shows the arrangement and design of a hydraulic control device 12. This hydraulic control device is a component part of the automatic transmission 1 and is within the housing 2. The hydraulic control device 12 is secured to sealing surface A of the transmission housing 2 by means of bolts 13. The hydraulic control device 12 is composed of one snorkel with a sieve 3, one valve housing 4, one intermediate plate with a seal 5 and the channel plate 6. The hydraulic control device 12 is partly wetted by the lubricant pan. It is known that the level of the lubricant pan is adjusted so that the snorkel and the sieve 3 are covered with lubricant in all driving situations. In FIG. 1 said lubricant level is shown by reference letter B. The lubricant level B thus does not reach the sealing surface A. One pump, not labeled in FIG. 1, which is situated in the automatic transmission sucks, throughout the hydraulic control device, the lubricant from the lubricant pan by means of the snorkel 3. The intermediate plate with seal 5 is between the valve housing 4 and a channel plate 6. The sealing of channel plate 6 relative to the transmission housing 2, sealing surface A, is absolutely metallic. No other seal can be situated, between the channel plate 6 and the housing 2, due to the setting properties of the bolts 13.

Figure 2:
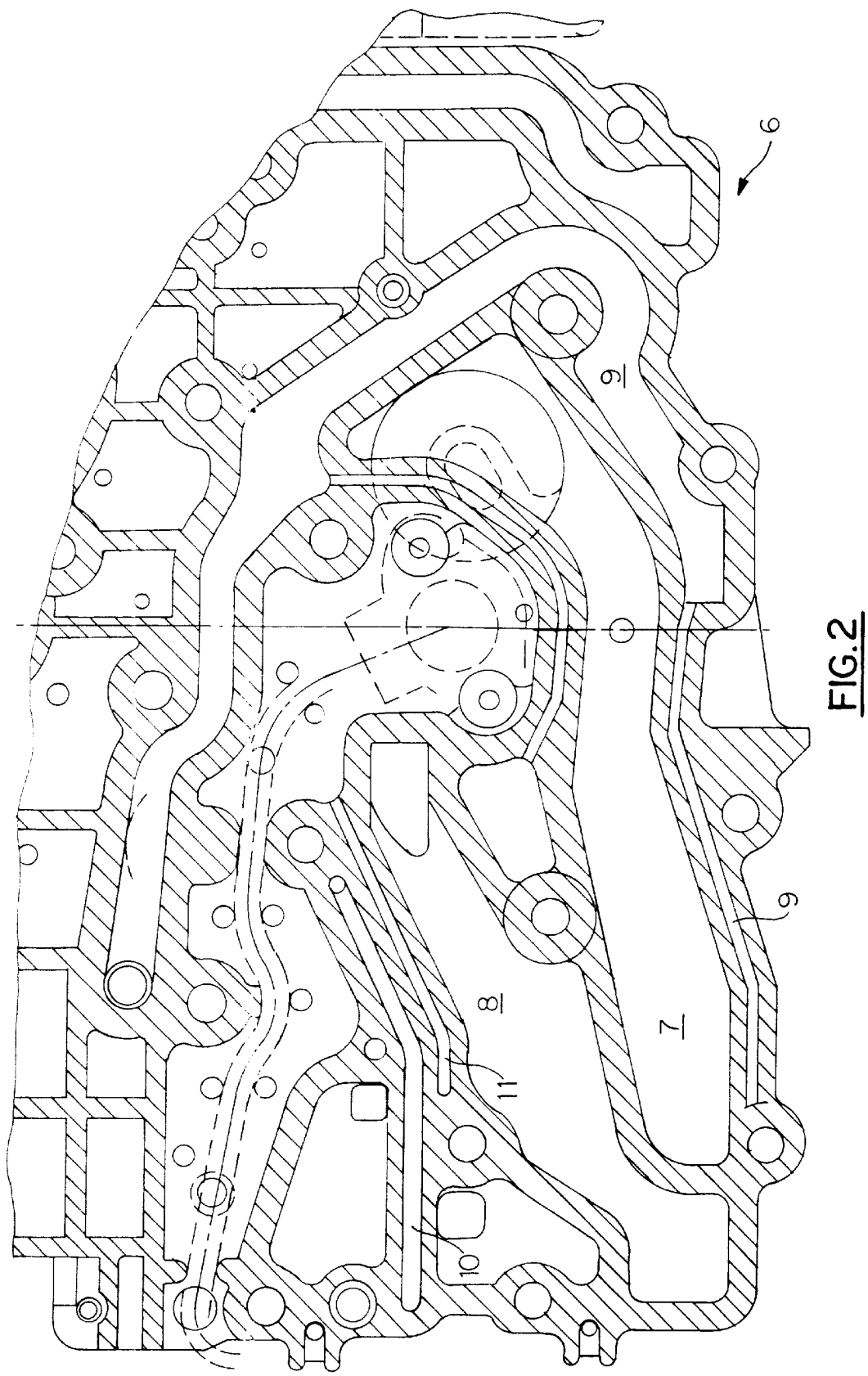
FIG. 2 is a channel plate.

FIG. 2 shows a top view of the channel plate 6. The sealing surface A is shown shaded. The reference numeral 7 shows an intake channel through which the pump sucks the lubricant from the lubricant pan via the snorkel. Vacuum thus prevails in the intake channel 7. Due to the setting properties of the bolts 13, leakage results. According to the prior art, the intake channel 7 would, in this case, suck air from the interior of the transmission housing 2. The solution, according to the invention, now consists in that the intake channel 7 is surrounded, in the direction of the outer side of the channel plate, by the distribution channel 9. The distribution channel 9 holds a higher pressure level than the intake channel 7, for example, 2 bar. In case of leakage, the intake channel 7 thus sucks the hydraulic fluid from the distribution channel 9. Another embodiment is also shown in FIG. 2. The reference numeral 8 shows the main pressure channel which holds a pressure level, for example, of 16 bar. The reference numeral 10 shows a measuring channel which serves, for example, to measure the pressure level in the converter clutch. According to the prior art, leakage would cause the hydraulic fluid to migrate from the main pressure channel in the direction of the measuring channel 10 and thus adulterate the result of the measurement. The solution, according to the invention, now consists in that an auxiliary channel 11 is situated between the main pressure channel 8 and the measuring channel 10. The auxiliary channel 11 is pressureless. A leakage thus causes the hydraulic fluid to migrate from the main pressure channel to the auxiliary channel 11 and is thus unable to reach the measuring channel 10.

The solution, according to the invention, can be used in the following cases:

sealing points of the intake channel with vacuum which either permanently, or in certain driving situations, are not in the lubricant pan;

critical pressure channels in which channels, extending side by side, have great pressure differences, for example, a main pressure channel with 16 bar and a measuring channel with 5 bar.

Typical spheres of use would thus be the hydraulic control device of stepped and continuously variable automatic transmissions.

| Reference numerals | |
|---|---|
| 1 | automatic transmission |
| 2 | transmission housing |
| 3 | snorkel with sieve |
| 4 | valve housing |
| 5 | intermediate plate with seal |
| 6 | channel plate |
| 7 | intake channel |
| 8 | main pressure channel |
| 9 | distribution channel |
| 10 | measuring channel |
| 11 | auxiliary channel |
| 12 | hydraulic control device |
| 13 | bolts |
| A | sealing surface |
| B | lubricant level |

I claim:

1. An arrangement sealing a hydraulic control device (12) which is assembled on an underside of an automatic transmission (1) including a housing (2) so that said hydraulic control device (12) is only partly wetted by the lubricant pan, said hydraulic control device (12) comprising one intake snorkel (3), one valve housing (4) connected therewith, one intermediate plate with a seal (5) and one channel plate (6), said hydraulic control device (12) is secured to said transmission housing (2), said channel plate (6) and said transmission housing (2) coming into contact with one another by two sealing surfaces, one pump sucks the hydraulic fluid from said lubricant pan through said hydraulic control device (12) or advances the hydraulic fluid with high pressure level to said valve housing (4) which is adapted to house electromagnetic actuators and hydraulic valves by which the clutches or brakes of said automatic transmission are controlled, wherein said channel plate (6) has at least one intake channel (7), one main pressure channel (8), and distribution and measuring channels (9, 10), said intake channel (7) being at least partly surrounded by one distribution channel (9), said distribution channel (9) holds a higher pressure level than said intake channel (7), and said distribution channel (9) is between said intake channel (7) and an outer side of said channel plate (6).

2. The arrangement according to claim 1, wherein said main pressure channel (8) is at least partly surrounded by pressureless auxiliary channels (11), the latter being situated between said main pressure channel (8) and a measuring channel (10).

* * * * *